US012573084B2

(12) United States Patent (10) Patent No.: US 12,573,084 B2
Mori (45) Date of Patent: Mar. 10, 2026

(54) INFORMATION PROCESSING SYSTEM, INFORMATION PROCESSING METHOD, AND INFORMATION PROCESSING PROGRAM

(71) Applicant: TOYOTA JIDOSHA KABUSHIKI KAISHA, Toyota (JP)

(72) Inventor: Yuto Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 18/497,154

(22) Filed: Oct. 30, 2023

(65) Prior Publication Data

US 2024/0193806 A1 Jun. 13, 2024

(30) Foreign Application Priority Data

Dec. 7, 2022 (JP) ................................. 2022-195662

(51) Int. Cl.
*G06T 7/73* (2017.01)
(52) U.S. Cl.
CPC ...... *G06T 7/73* (2017.01); *G06T 2207/30196* (2013.01); *G06T 2207/30232* (2013.01)
(58) Field of Classification Search
None
See application file for complete search history.

(56) References Cited

U.S. PATENT DOCUMENTS

| | | | |
|---|---|---|---|
| 2006/0130594 A1 | 6/2006 | Ikeuchi | |
| 2020/0125855 A1* | 4/2020 | Yamashita | G07C 9/32 |
| 2020/0143561 A1* | 5/2020 | Hallett | G06T 7/13 |
| 2020/0210692 A1* | 7/2020 | Asayama | G06V 40/23 |
| 2020/0273200 A1* | 8/2020 | Ellwein | G06T 7/73 |
| 2020/0327693 A1* | 10/2020 | Arimatsu | G06F 3/01 |
| 2022/0083769 A1 | 3/2022 | Nakayama et al. | |
| 2022/0222605 A1* | 7/2022 | Kawai | G06T 7/0002 |
| 2023/0377599 A1* | 11/2023 | Hagiwara | G10L 25/51 |
| 2024/0089580 A1* | 3/2024 | Nomura | G06V 40/10 |
| 2024/0177526 A1* | 5/2024 | Takahashi | G06V 20/52 |
| 2024/0304022 A1* | 9/2024 | Baba | B60R 21/015 |

FOREIGN PATENT DOCUMENTS

| JP | 2006-167313 A | 6/2006 |
|---|---|---|
| JP | 2016-149024 A | 8/2016 |
| JP | 2022-048017 A | 3/2022 |
| JP | 2022042355 A | 3/2022 |

* cited by examiner

*Primary Examiner* — Delomia L Gilliard
(74) *Attorney, Agent, or Firm* — Dinsmore & Shohl LLP

(57) ABSTRACT

An information processing system including: an acquisition unit configured to acquire skeletal information of a person to be monitored; a coordinate axis determination unit configured to determine a reference coordinate axis based on the skeletal information of the person to be monitored; an association unit configured to associate an area where predetermined work is executed by the person to be monitored with coordinates defined by the reference coordinate axis; and an output unit configured to output information about execution of the predetermined work by the person to be monitored, the information including the area where the predetermined work is executed by the person to be monitored and the coordinates corresponding to the area.

9 Claims, 7 Drawing Sheets

LEFT HIP JOINT

CENTER OF WAIST (ORIGIN)

RIGHT HIP JOINT

VERTICALLY UPWARD DIRECTION

RIGHT HAND
LEFT HAND
AREA A 1
AREA A 2
AREA A 3

LEFT HIP JOINT

CENTER OF WAIST (ORIGIN)

RIGHT HIP JOINT

VERTICALLY UPWARD DIRECTION

RIGHT HAND
LEFT HAND
AREA A1
AREA A2
AREA A3

INFORMATION PROCESSING SYSTEM, INFORMATION PROCESSING METHOD, AND INFORMATION PROCESSING PROGRAM

CROSS REFERENCE TO RELATED APPLICATIONS

This application is based upon and claims the benefit of priority from Japanese patent application No. 2022-195662, filed on Dec. 7, 2022, the disclosure of which is incorporated herein in its entirety by reference.

BACKGROUND

The present disclosure relates to an information processing system, an information processing method, and an information processing program.

In recent years, there has been a demand that the efficiency of work regarding predetermined work executed by a worker who works in a factory etc. be improved. As a result, in recent years, there has been a demand that the execution status of predetermined work executed by a worker from the viewpoint of the worker be effectively monitored. The related art is disclosed, for example, in Japanese Unexamined Patent Application Publication No. 2022-042355.

Japanese Unexamined Patent Application Publication No. 2022-042355 discloses an information processing technology for detecting a position of a subject under a specific work environment and storing a type of work executed and a position (position coordinates) where the work was executed.

SUMMARY

However, there is a problem in the information processing technology disclosed in Japanese Unexamined Patent Application Publication No. 2022-042355 that since the fact that different workers have different working postures is not taken into account, it is not possible to monitor the execution status of predetermined work executed by a worker based on a working posture of the worker. That is, there is a problem in the information processing apparatus disclosed in Japanese Unexamined Patent Application Publication No. 2022-042355 that it is not possible to effectively monitor the execution status of the predetermined work executed by a worker (a person to be monitored) from the viewpoint of the worker.

The present disclosure has been made in view of the aforementioned circumstances and an object thereof is to provide an information processing system, an information processing method, and an information processing program that are capable of effectively monitoring the execution status of predetermined work executed by a person to be monitored from the viewpoint of the person to be monitored.

An information processing system according to the present disclosure includes: an acquisition unit configured to acquire skeletal information of a person to be monitored; a coordinate axis determination unit configured to determine a reference coordinate axis based on the skeletal information of the person to be monitored; an association unit configured to associate an area where predetermined work is executed by the person to be monitored with coordinates defined by the reference coordinate axis; and an output unit configured to output information about execution of the predetermined work by the person to be monitored, the information including the area where the predetermined work is executed by the person to be monitored and the coordinates corresponding to the area. The information processing system can monitor the execution status of predetermined work executed by a person to be monitored based on a reference coordinate axis determined based on skeletal information of the person to be monitored (a working posture of the person to be monitored). That is, the information processing system can effectively monitor the execution status of predetermined work executed by a person to be monitored from the viewpoint of the person to be monitored.

The coordinate axis determination unit may determine the reference coordinate axis using a center of the waist of the person to be monitored specified from the skeletal information of the person to be monitored as the origin of the reference coordinate axis.

The coordinate axis determination unit may determine the reference coordinate axis so that a vertical direction is a z-axis, a horizontal direction passing through the center of the waist and the right and left hip joints as viewed from the z-axis is a y-axis, and a horizontal direction perpendicular to the y-axis is an x-axis.

The acquisition unit may acquire, by analyzing an image captured by a camera configured to capture a person to be monitored, skeletal information of the person to be monitored. Note that the acquisition unit may estimate skeletal information of a person to be monitored from an image captured by the camera using an estimation model generated by machine learning and acquire it.

The output unit may display the area where the predetermined work is executed, an execution order of the predetermined pieces of work, and coordinates of the reference coordinate axis on a monitor as the information about execution of the predetermined work by the person to be monitored.

An information processing method according to the present disclosure is an information processing method performed by a computer, the information processing method including: acquiring skeletal information of a person to be monitored; determining a reference coordinate axis based on the skeletal information of the person to be monitored; associating an area where predetermined work is executed by the person to be monitored with coordinates defined by the reference coordinate axis; and outputting information about execution of the predetermined work by the person to be monitored, the information including the area where the predetermined work is executed by the person to be monitored and the coordinates corresponding to the area. The information processing method can monitor the execution status of predetermined work executed by a person to be monitored based on a reference coordinate axis determined based on skeletal information of the person to be monitored (a working posture of the person to be monitored). That is, the information processing method can effectively monitor the execution status of predetermined work executed by a person to be monitored from the viewpoint of the person to be monitored.

An information processing program according to the present disclosure causes a computer to: acquire skeletal information of a person to be monitored; determine a reference coordinate axis based on the skeletal information of the person to be monitored; associate an area where predetermined work is executed by the person to be monitored with coordinates defined by the reference coordinate axis; and output information about execution of the predetermined work by the person to be monitored, the information including the area where the predetermined work is executed by the person to be monitored and the coordinates corresponding to the area. The information processing program can monitor the execution status of predetermined work executed by a person to be monitored based on a reference coordinate axis determined based on skeletal information of the person to be monitored (a working posture of the person to be monitored). That is, the information processing program can effectively monitor the execution status of predetermined work executed by a person to be monitored from the viewpoint of the person to be monitored.

According to the present disclosure, it is possible to provide an information processing system, an information processing method, and an information processing program that are capable of effectively monitoring the execution status of predetermined work executed by a person to be monitored from the viewpoint of the person to be monitored.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
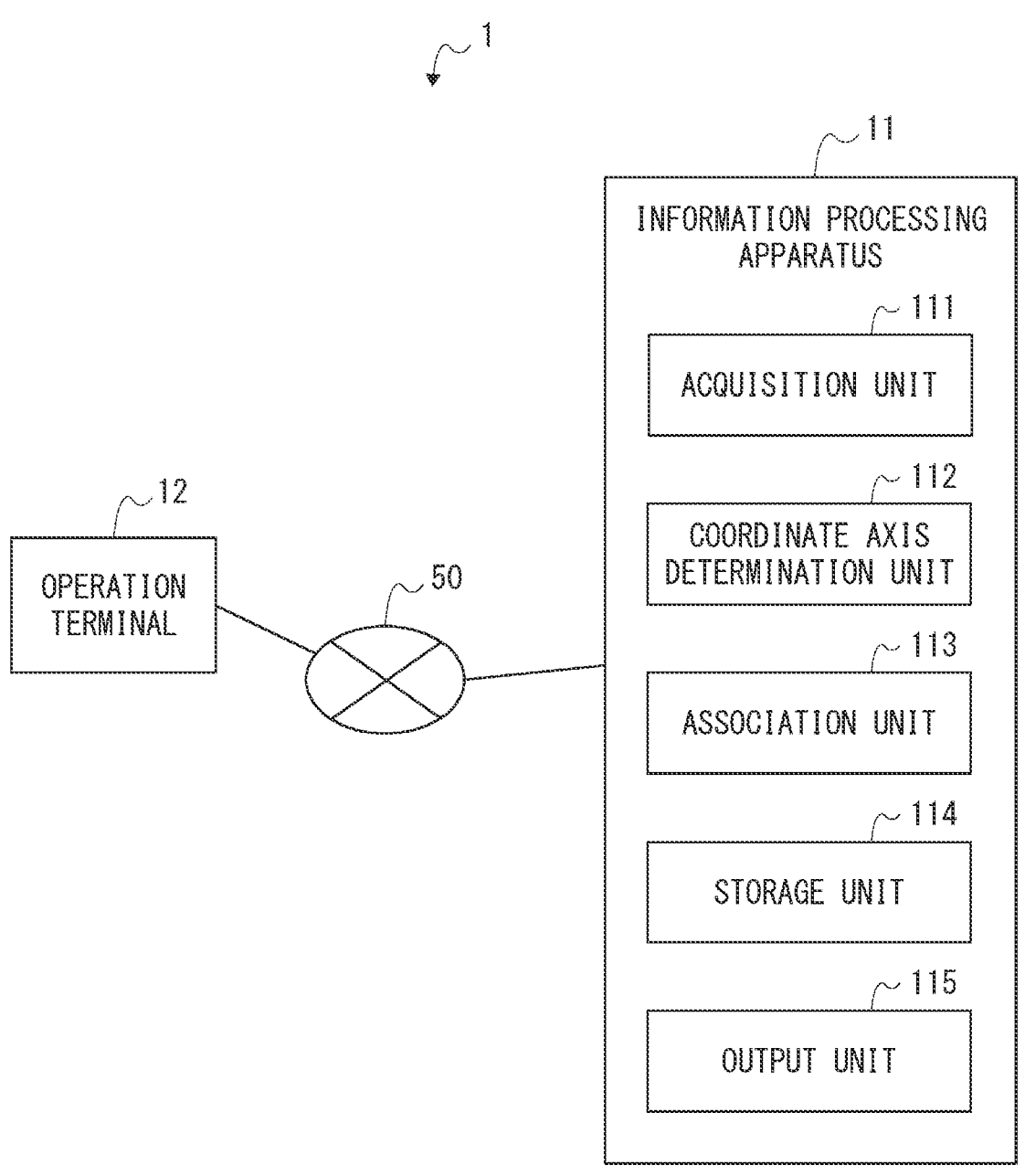
FIG. 1 is a block diagram showing an example of a configuration of an information processing system according to a first embodiment.

The present disclosure will be described hereinafter with reference to an embodiment of the present disclosure. However, the following embodiment is not intended to limit the scope of the disclosure according to the claims. Further, all the components/structures described in the embodiment are not necessarily essential as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

FIG. 1 is a block diagram showing an example of a configuration of an information processing system 1 according to a first embodiment. The information processing system 1 according to this embodiment is a system that monitors the execution status of predetermined work executed by a worker (a person to be monitored) in a work area such as a factory and, for example, proposes improvement of a work environment. Note that the information processing system 1 according to this embodiment can monitor the execution status of predetermined work executed by a person to be monitored based on a reference coordinate axis determined based on skeletal information of the person to be monitored (a working posture of the person to be monitored). That is, the information processing system 1 can effectively monitor the execution status of predetermined work executed by a person to be monitored from the viewpoint of the person to be monitored.

Specifically, the information processing system 1 includes an information processing apparatus 11, an operation terminal 12, and a network 50. The information processing apparatus 11 itself can also be referred to as an information processing system. The information processing apparatus 11 and the operation terminal are configured so that they can communicate with each other through the wired or wireless network 50. Note that, in this embodiment, a description will be given of a case in which the information processing apparatus 11 and the operation terminal 12 are separately provided. However, the present disclosure is not limited thereto; for example, the information processing apparatus 11 may have the functions of the operation terminal 12. That is, the information processing apparatus 11 and the operation terminal 12 may be integrally formed.

The operation terminal 12 is a terminal capable of performing communication owned by a user or temporarily assigned to a user, such as a Personal Computer (PC) terminal, a mobile terminal such as a smartphone or a tablet terminal, or a dedicated communication terminal prepared for the information processing system 1.

For example, a user such as an administrator who monitors the execution status of work executed by a worker in a work area to which the information processing system 1 is applied inputs, to the operation terminal 12, information about a worker to be monitored (a person to be monitored), information about work contents, and the like by operating an operation screen, a keyboard, and the like of the operation terminal 12. The information about a person to be monitored includes information including skeletal information of the person to be monitored who is executing predetermined work. The information including skeletal information of the person to be monitored who is executing predetermined work is, for example, an image including the person to be monitored who is executing predetermined work captured by a camera. The operation terminal 12 receives these pieces of information and transmits them to the information processing apparatus 11 through the network 50. Further, the operation terminal 12 receives a result of the monitoring output from the information processing apparatus 11 through the network 50 and displays it on a monitor or the like.

The information processing apparatus 11 monitors the execution status of predetermined work executed by a person to be monitored in a work area. Specifically, the information processing apparatus 11 includes an acquisition unit 111, a coordinate axis determination unit 112, an association unit 113, a storage unit 114, and an output unit 115.

The acquisition unit 111 acquires information transmitted from the operation terminal 12. Specifically, the acquisition unit 111 acquires information about a person to be monitored and information about work contents. For example, the acquisition unit 111 acquires, as information about a person to be monitored, an image including the person to be monitored who is executing predetermined work captured by a camera. In this case, the acquisition unit 111 acquires skeletal information of the person to be monitored who is executing predetermined work by analyzing an image captured by the camera using three-dimensional skeleton estimation technique or the like. The skeletal information is indicated by, for example, points indicating specified joints and body parts of a person to be monitored and a line segment that connects them. Skeletal information may be estimated using an estimation model generated by machine learning.

The coordinate axis determination unit 112 determines a reference coordinate axis based on the acquired skeletal information of a person to be monitored. In other words, the coordinate axis determination unit 112 determines a reference coordinate axis in accordance with the acquired working posture of a person to be monitored. For example, the coordinate axis determination unit 112 determines a reference coordinate axis so that the center of the waist of a person to be monitored specified from skeletal information of the person to be monitored is the origin of the reference coordinate axis, and so that a vertical direction is a z-axis, a horizontal direction passing through the center of the waist and the right and left hip joints as viewed from the z-axis is a y-axis, and a horizontal direction perpendicular to the y-axis is an x-axis. The coordinate axis determination unit 112 determines a reference coordinate axis for each working posture of the person to be monitored.

The association unit 113 associates an area where predetermined work is executed by a person to be monitored with coordinates defined by the reference coordinate axis. Note that the area where predetermined work is executed by a person to be monitored means, for example, a position (work point) of a hand of the person to be monitored when the person to be monitored executes work while maintaining the person's working posture.

Further, the association unit 113 can associate a workable area A (i.e., an area A where work can be executed), which is a range within which a hand of a person to be monitored can reach while maintaining the person's working posture, with the coordinates defined by the reference coordinate axis. Note that the workable area A may be classified into a plurality of areas. For example, the workable area A may be classified into an area A1 that can be reached by the hand of a person to be monitored while the position of the elbow is fixed, an area A2 that is further away from the person to be monitored than the area A1 and that can be reached by the hand of the person to be monitored while the position of the elbow is within a predetermined range, and an area A3 that is further away from the person to be monitored than the areas A1 and A2 and that can be reached by the hand of the person to be monitored while the position of the elbow is outside the predetermined range. For example, the execution of work in the area A1 is most preferable, the execution of work in the area A2 is within an acceptable range, and the execution of work in the area A3 is within an acceptable range but needs to be further improved. In addition, even when work is executed in the area A2, it may be required to be further improved depending on the execution order of pieces of work, for example, in a case where the left hand crosses the right hand. Further, it is determined that, for example, the execution of work outside the workable area A should be improved.

Information about execution of predetermined work by a person to be monitored, such as the area where predetermined work is executed by the person to be monitored and the coordinates of the reference coordinate axis corresponding thereto, and the execution order of pieces of predetermined work, is stored in the storage unit 114. Note that the storage unit 114 may be provided outside the information processing apparatus 11 as a storage device and configured to communicate with the information processing apparatus 11 through the network 50.

The output unit 115 outputs the information about execution of predetermined work by a person to be monitored, such as the area where predetermined work is executed by the person to be monitored and the coordinates of the reference coordinate axis corresponding thereto, and the execution order of pieces of predetermined work. The information (result of the monitoring) output from the output unit 115 is transferred to the operation terminal 12, for example, through the network 50, and is displayed on a monitor of the operation terminal 12 or is output by voice from a speaker. As a result, a user can know the execution status of predetermined work executed by a person to be monitored from the viewpoint of the person to be monitored.

(Operations Performed by the Information Processing System 1)

Figure 2:
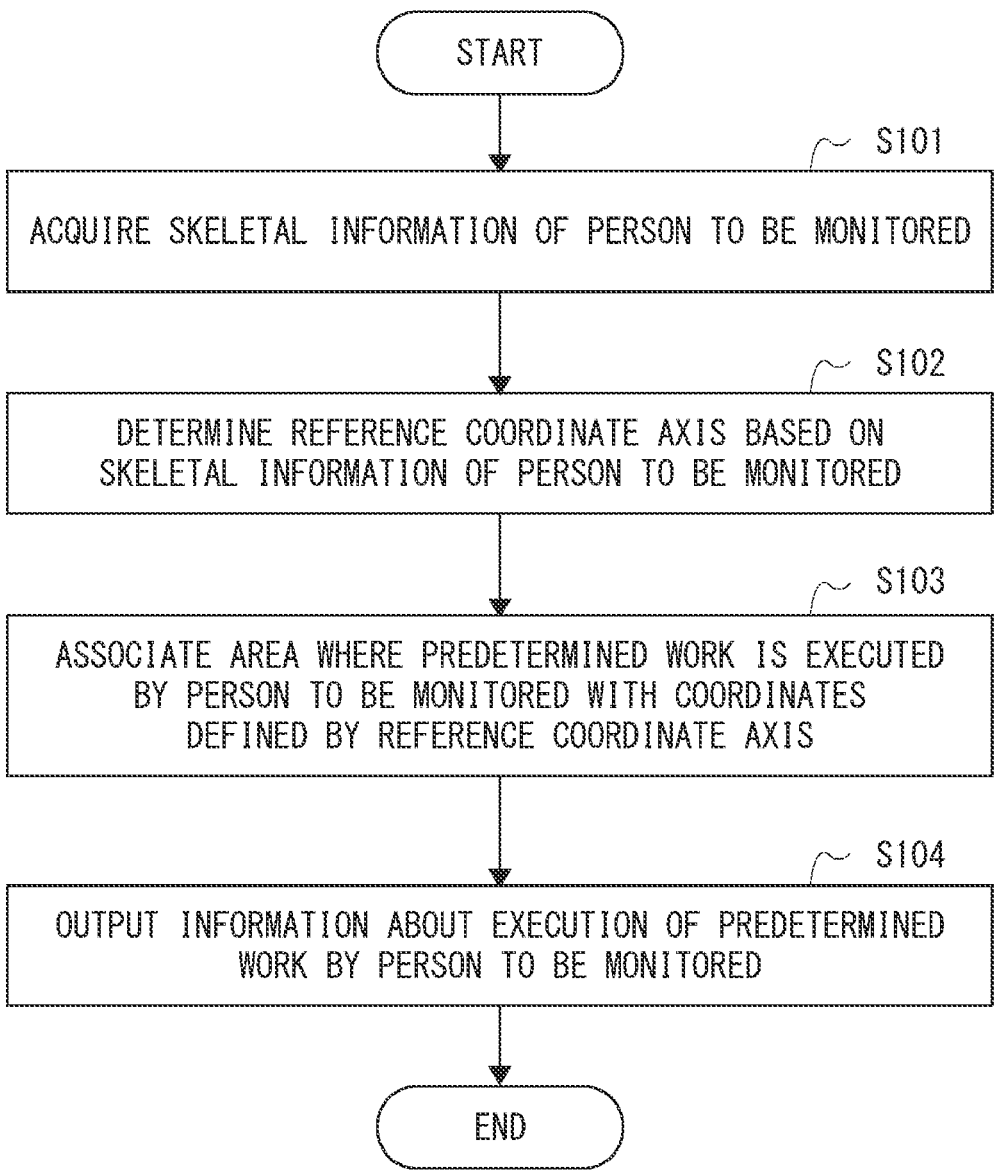
FIG. 2 is a flowchart showing operations performed by the information processing system according to the first embodiment.
Figure 3:
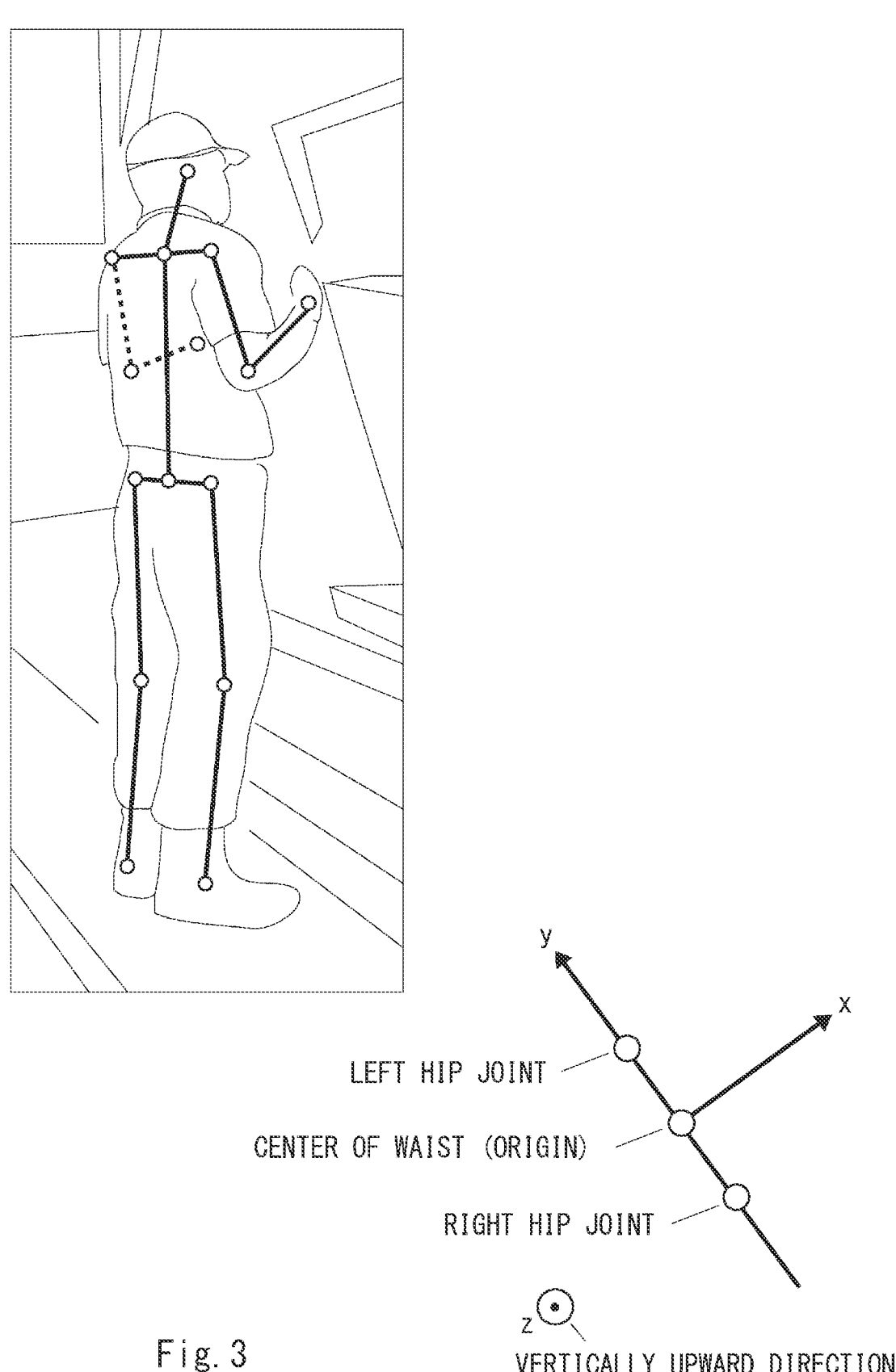
FIG. 3 is a schematic diagram showing an image including a person to be monitored who is executing predetermined work W1 captured by a camera and skeletal information acquired from the image.
Figure 4:
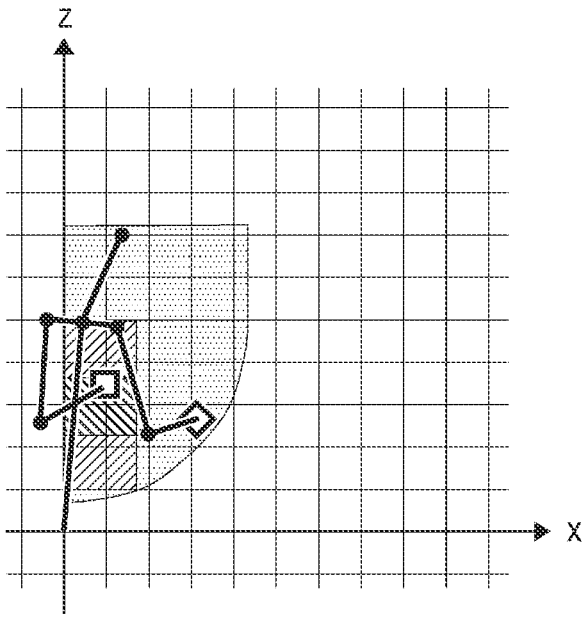
FIG. 4 is a diagram showing work points where the predetermined work W1 is executed by the person to be monitored plotted on a reference coordinate axis determined based on the skeletal information of the person to be monitored acquired from the image shown in FIG. 3.
Figure 4:
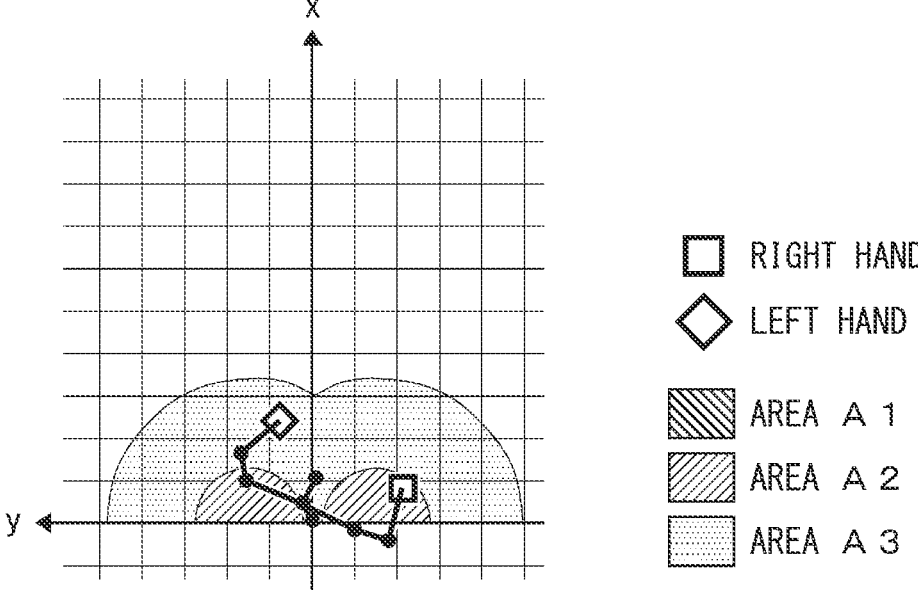
Figure 5:
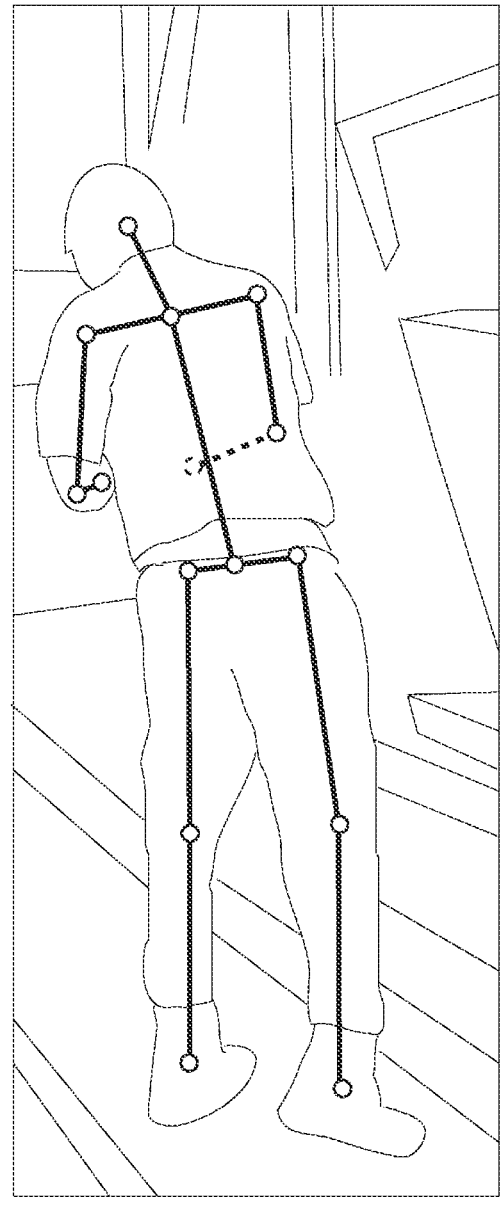
FIG. 5 is a schematic diagram showing an image including a person to be monitored who is executing predetermined work W2 captured by a camera and skeletal information acquired from the image.
Figure 5:
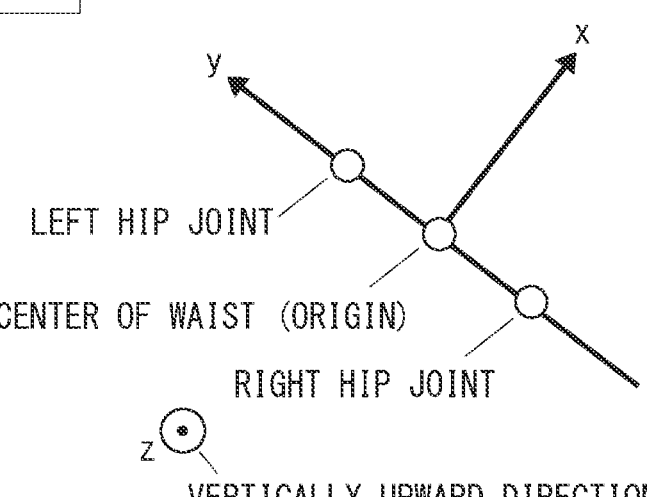
Figure 6:
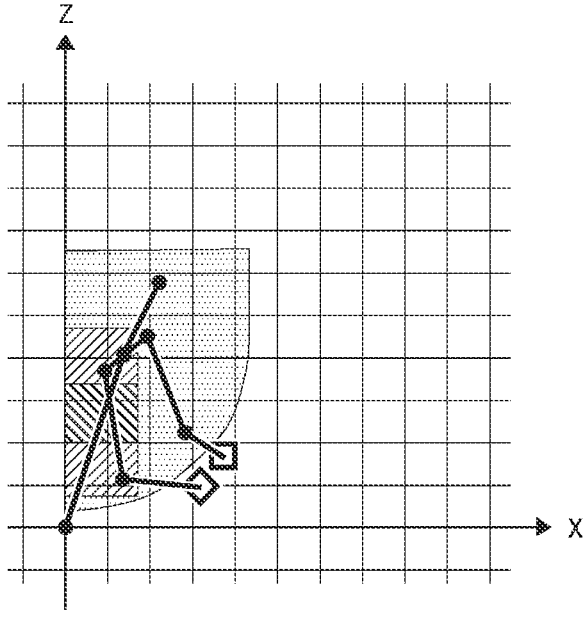
FIG. 6 is a diagram showing work points where the predetermined work W2 is executed by the person to be monitored plotted on a reference coordinate axis determined based on the skeletal information of the person to be monitored acquired from the image shown in FIG. 5.
Figure 6:
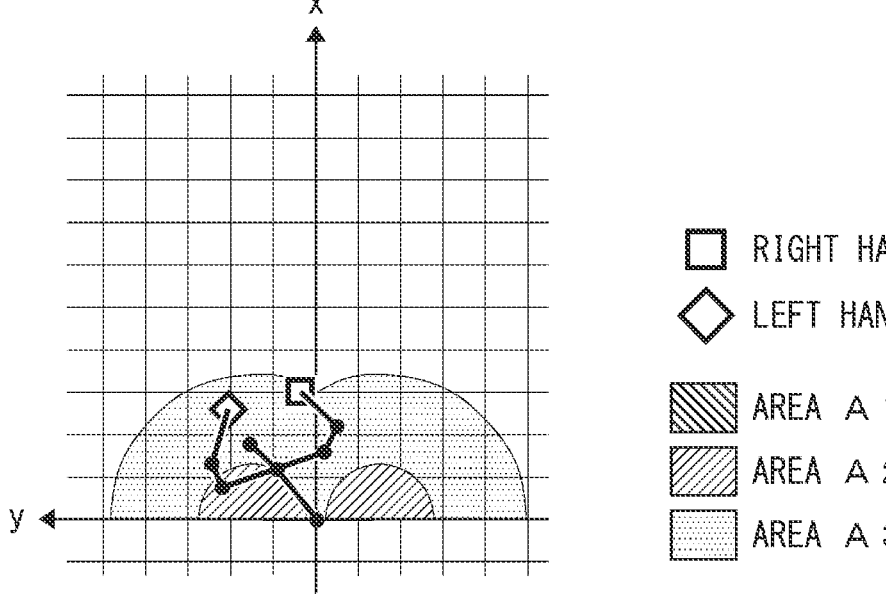
Figure 7:
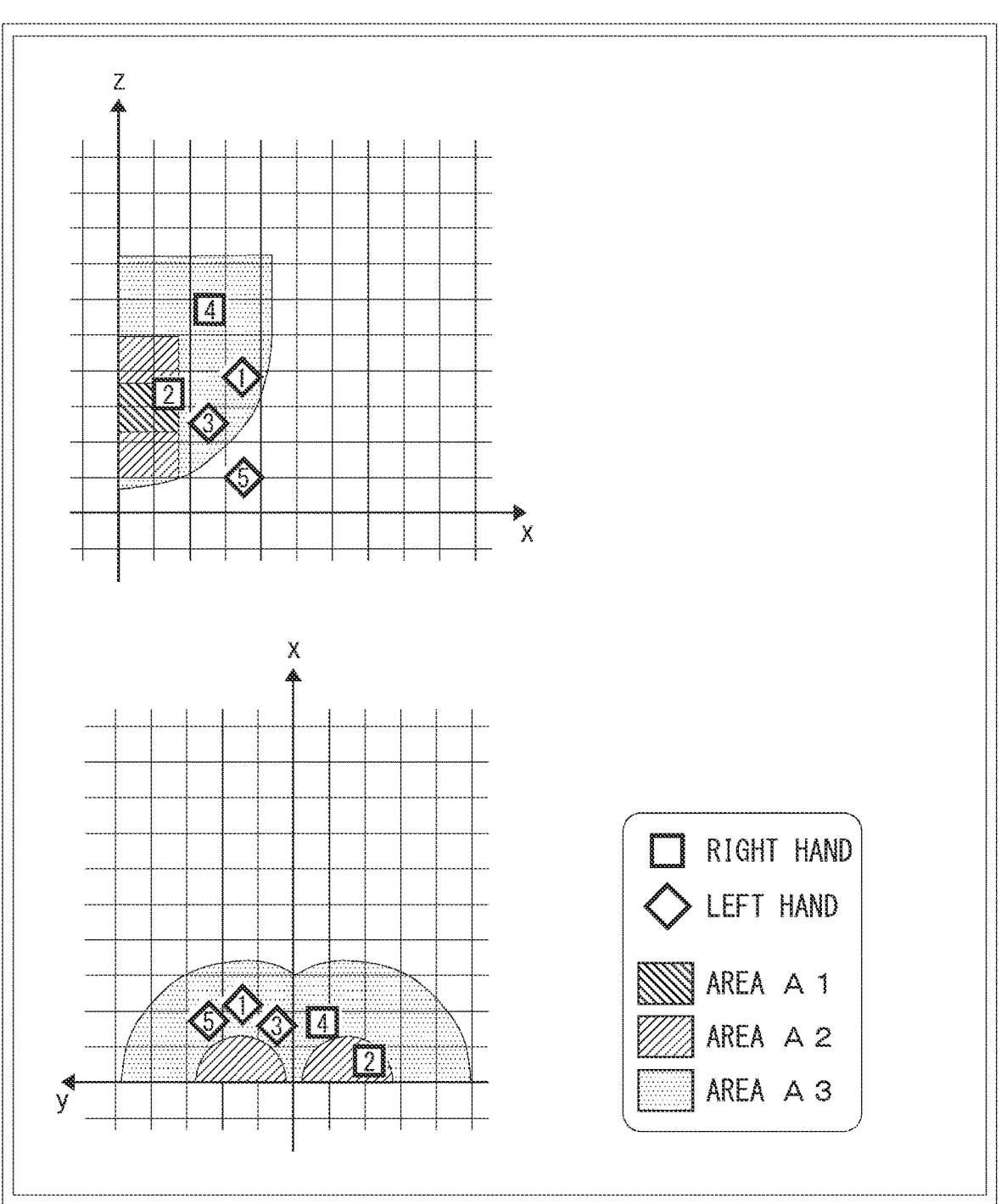
FIG. 7 is a diagram showing an example of a result of monitoring displayed on a monitor of an operation terminal.

Next, operations performed by the information processing system 1 will be described with reference to FIGS. 2 to 7 in addition to FIG. 1. FIG. 2 is a flowchart showing the operation performed by the information processing system 1. FIG. 3 is a schematic diagram showing an image including a person to be monitored who is executing predetermined work W1 captured by a camera and skeletal information acquired from the image. FIG. 4 is a diagram showing work points where the predetermined work W1 is executed by the person to be monitored plotted on a reference coordinate axis determined based on the skeletal information of the person to be monitored shown in FIG. 3. FIG. 5 is a schematic diagram showing an image including a person to be monitored who is executing predetermined work W2 captured by a camera and skeletal information acquired from the image. FIG. 6 is a diagram showing work points where the predetermined work W2 is executed by the person to be monitored plotted on a reference coordinate axis determined based on the skeletal information of the person to be monitored shown in FIG. 5. FIG. 7 is a diagram showing an example of a result of monitoring displayed on the monitor of the operation terminal 12.

In the information processing system 1, the information processing apparatus 11 first acquires information about a person to be monitored and information about work contents transmitted from the operation terminal 12 and the like. Note that the information about a person to be monitored includes skeletal information of the person to be monitored who is executing predetermined work. For example, the information processing apparatus 11 acquires an image including a person to be monitored who is executing predetermined work captured by a camera, as shown in FIGS. 3 and 5, and analyzes the acquired image captured by the camera using a three-dimensional skeleton estimation technique or the like, thereby acquiring skeletal information of the person to be monitored who is executing predetermined work (Step S101).

Then, the information processing apparatus 11 determines a reference coordinate axis based on the acquired skeletal information of the person to be monitored (Step S102). For example, as shown in FIGS. 3 and 5, the information processing apparatus 11 determines a reference coordinate axis so that the center of the waist of a person to be monitored specified from skeletal information of the person to be monitored is the origin of the reference coordinate axis, and so that a vertical direction is a z-axis, a horizontal direction passing through the center of the waist and the right and left hip joints as viewed from the z-axis is a y-axis, and a horizontal direction perpendicular to the y-axis is an x-axis.

Then, the information processing apparatus 11 associates an area (work point) where predetermined work is executed by the person to be monitored with coordinates defined by the reference coordinate axis (Step S103).

Further, the information processing apparatus 11 can associate the workable area A, which is a range within which a hand of a person to be monitored can reach while maintaining the person's working posture, to the coordinates defined by the reference coordinate axis. Note that, as described above, the information processing apparatus 11 may classify the workable area A into, for example, an area A1 that can be reached by the hand of a person to be monitored while the position of the elbow is fixed, an area A2 that is further away from the person to be monitored than the area A1 and that can be reached by the hand of the person to be monitored while the position of the elbow is within a predetermined range, and an area A3 that is further away from the person to be monitored than the areas A1 and A2 and that can be reached by the hand of the person to be monitored while the position of the elbow is outside the predetermined range.

In the example shown in FIG. 4, the work points (the areas) where the predetermined work W1 is executed by a person to be monitored are plotted on the reference coordinate axis determined based on skeletal information of the person to be monitored acquired from the image shown in FIG. 3. Note that, in FIG. 4, when the zx plan is viewed from the y-axis direction, the work point of the right hand is located in the area A1, and the work point of the left hand is located in the area A3. Further, in FIG. 4, when the xy plane is viewed from the z-axis direction, the work point of the right hand is located in the area A2, and the work point of the left hand is located in the area A3. Therefore, although there will basically be no problem with execution of the predetermined work W1 by a person to be monitored, the work executed at the work point of the left hand needs to be further improved.

In the example shown in FIG. 6, the work points (the areas) where the predetermined work W2 is executed by a person to be monitored are plotted on the reference coordinate axis determined based on skeletal information of the person to be monitored acquired from the image shown in FIG. 5. Note that, in FIG. 6, when the zx plan is viewed from the y-axis direction, the work point of the right hand and the work point of the left hand are both located outside the workable area A. Therefore, it is necessary for the person to be monitored to move the person's posture and then execute the work. Further, in FIG. 6, when the xy plane is viewed from the z-axis direction, the work point of the right hand and the work point of the left hand are both located in the area A1. Further, in FIG. 6, when the zx plan is viewed from the y-axis direction, it can be seen that the posture of the person to be monitored is inclined. Therefore, it is considered that it is necessary to further improve the execution of the predetermined work W2 by the person to be monitored, such as by changing the work environment.

Then, the information processing apparatus 11 outputs information about execution of predetermined work by a person to be monitored, such as the area where predetermined work is executed by the person to be monitored and the coordinates of the reference coordinate axis corresponding thereto, and the execution order of pieces of predetermined work (Step S104). The information (result of the monitoring) output from the output unit 115 is transferred to the operation terminal 12, for example, through the network 50, and is displayed on a monitor of the operation terminal 12 or is output by voice from a speaker. As a result, a user can know the execution status of predetermined work executed by a person to be monitored from the viewpoint of the person to be monitored. For example, information shown in FIGS. 4 and 6 may be displayed on the monitor, or information about the execution order of pieces of work shown in FIG. 7 may be displayed on the monitor.

As described above, the information processing system 1 according to this embodiment can monitor the execution status of predetermined work executed by a person to be monitored based on a reference coordinate axis determined based on skeletal information of the person to be monitored (a working posture of the person to be monitored). That is, the information processing program can effectively monitor the execution status of predetermined work executed by a person to be monitored from the viewpoint of the person to be monitored.

The present disclosure is not limited to the above-described embodiment and may be changed as appropriate without departing from the scope of the present disclosure.

In this embodiment, a description has been given of an example of a case in which skeletal information of a person to be monitored is estimated by analyzing an image captured by a camera. However, the present disclosure is not limited thereto; the skeletal information may be estimated from an image captured by a motion capture camera or from a sensor attached to the person to be monitored.

Further, in this embodiment, a description has been given of an example of a case in which the origin of the reference coordinate axis determined by the coordinate axis determination unit 112 is the center of the waist of a person to be monitored. However, the present disclosure is not limited thereto; it may be any place in accordance with the setting of a user. Further, a method for determining the x, y, and z axes of the reference coordinate axis determined by the coordinate axis determination unit 112 may be freely set by a user.

Further, in the present disclosure, it is possible to implement all or part of processing performed by the information processing apparatus 11 by causing a Central Processing Unit (CPU) to execute a computer program.

The above-described program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray® disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing system comprising a central processing unit and configured to:
   acquire skeletal information of a person to be monitored;
   determine a reference coordinate axis based on the skeletal information of the person to be monitored;
   associate an area where predetermined work is executed by the person to be monitored with coordinates defined by the reference coordinate axis, the area being classified into a first area that can be reached by a hand of the person to be monitored while a position of an elbow of the person to be monitored is fixed, a second area that is farther away from the person to be monitored than the first area and that can be reached by a hand of the person to be monitored while the position of the elbow of the person to be monitored is within a predetermined range, and a third area that is further away from the person to be monitored than the first area and the second area and that can be reached by the hand of the person to be monitored while the position of the elbow of the person to be monitored is outside the predetermined range;
   determine whether improvement of execution of the predetermined work is needed based on locations of work points of a right hand and of a left hand of the person to be monitored with respect to the first area, the second area, and the third area; and
   output information about execution of the predetermined work by the person to be monitored, the information including the area where the predetermined work is executed by the person to be monitored and the coordinates corresponding to the area.

2. The information processing system according to claim 1, further configured to determine the reference coordinate axis using a center of a waist of the person to be monitored specified from the skeletal information of the person to be monitored as the origin of the reference coordinate axis.

3. The information processing system according to claim 2, further configured to determine the reference coordinate axis so that a vertical direction is a z-axis, a horizontal direction passing through the center of the waist and right and left hip joints as viewed from the z-axis is a y-axis, and a horizontal direction perpendicular to the y-axis is an x-axis.

4. The information processing system according to claim 1, further configured to acquire, by analyzing an image captured by a camera configured to capture the person to be monitored, skeletal information of the person to be monitored.

5. The information processing system according to claim 1, further configured to display the area where the predetermined work is executed, an execution order of pieces of the predetermined work, and coordinates of the reference coordinate axis on a monitor as the information about execution of the predetermined work by the person to be monitored.

6. The information processing system according to claim 1, further configured to:
   determine a work point of the right hand of the person to be monitored is in the second area;
   determine a work point of the left hand of the person to be monitored is in the third area; and
   determine work executed at the work point of the left hand needs to be further improved in response to determining the work point of the right hand of the person to be monitored is in the second area and determining the work point of the left hand of the person to be monitored is in the third area.

7. The information processing system according to claim 1, further configured to:
   determine the predetermined work is executed in the second area and the left hand of the person to be monitored crosses the right hand of the person to be monitored; and
   determine the predetermined work is required to be further improved in response to determining the predetermined work is executed in the second area and the left hand of the person to be monitored crosses the right hand of the person to be monitored.

8. An information processing method performed by a computer, the information processing method comprising:
   acquiring skeletal information of a person to be monitored;
   determining a reference coordinate axis based on the skeletal information of the person to be monitored;
   associating an area where predetermined work is executed by the person to be monitored with coordinates defined by the reference coordinate axis, the area being classified into a first area that can be reached by a hand of the person to be monitored while a position of an elbow of the person to be monitored is fixed, a second area that is farther away from the person to be monitored than the first area and that can be reached by a hand of the person to be monitored while the position of the elbow of the person to be monitored is within a predetermined range, and a third area that is further away from the person to be monitored than the first area and the second area and that can be reached by the hand of the person to be monitored while the position of the elbow of the person to be monitored is outside the predetermined range;
   determining whether improvement of execution of the predetermined work is needed based on locations of work points of a right hand and of a left hand of the person to be monitored with respect to the first area, the second area, and the third area; and
   outputting information about execution of the predetermined work by the person to be monitored, the information including the area where the predetermined work is executed by the person to be monitored and the coordinates corresponding to the area.

9. A non-transitory computer readable medium storing an information processing program for causing a computer to:
   acquire skeletal information of a person to be monitored;
   determine a reference coordinate axis based on the skeletal information of the person to be monitored;
   associate an area where predetermined work is executed by the person to be monitored with coordinates defined by the reference coordinate axis, the area being classified into a first area that can be reached by a hand of the person to be monitored while a position of an elbow of the person to be monitored is fixed, a second area that is farther away from the person to be monitored than the first area and that can be reached by a hand of the person to be monitored while the position of the elbow of the person to be monitored is within a predetermined range, and a third area that is further away from the person to be monitored than the first area and the second area and that can be reached by the hand of the person to be monitored while the position of the elbow of the person to be monitored is outside the predetermined range;

determine whether improvement of execution of the predetermined work is needed based on locations of work points of a right hand and of a left hand of the person to be monitored with respect to the first area, the second area, and the third area; and output information about execution of the predetermined work by the person to be monitored, the information including the area where the predetermined work is executed by the person to be monitored and the coordinates corresponding to the area.

* * * * *